(12) United States Patent
Miller et al.

(10) Patent No.: US 6,427,570 B1
(45) Date of Patent: *Aug. 6, 2002

(54) DUST COLLECTION SYSTEM FOR COMPOUND MITER SAW

(75) Inventors: Philip Miller, Lutherville; Daryl S. Meredith, Hampstead; Michael L. O'Banion, Westminster, all of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/163,896

(22) Filed: Oct. 1, 1998

Related U.S. Application Data

(63) Continuation of application No. 08/600,907, filed on Feb. 13, 1996, now Pat. No. 5,819,619, which is a continuation of application No. 08/329,766, filed on Oct. 27, 1994, now abandoned, which is a continuation of application No. 08/088,266, filed on Jul. 7, 1993, now abandoned, which is a continuation of application No. 07/774,767, filed on Oct. 9, 1991, now abandoned.

(51) Int. Cl.$^7$ .............................. B26D 7/18; B27B 5/20
(52) U.S. Cl. ...................... 83/100; 83/468.7; 83/471.3; 83/490
(58) Field of Search .................... 83/100, 391, 393, 83/397, 468.3, 468.7, 471.2, 471.3, 478, 490, 581

(56) References Cited

U.S. PATENT DOCUMENTS

| 922,840 A | 5/1909 | Bemiller ...................... 83/100 |
| 1,476,196 A | 12/1923 | Dobyne ...................... 451/456 |
| 1,552,553 A | 9/1925 | Georgia .................... 144/252.1 |

(List continued on next page.)

FOREIGN PATENT DOCUMENTS

| DE | 2350245 | 4/1975 |
| DE | 2459440 | 8/1976 |
| DE | 3136590 | 3/1983 |
| DE | 8815327 | 5/1989 |
| EP | 0048331 | 8/1981 |
| EP | 0055896 | 11/1981 |
| GB | 1315720 | 5/1973 |
| GB | 1468096 | 3/1977 |
| GB | 1499692 | 2/1978 |
| IT | 1133993 | 10/1979 |

OTHER PUBLICATIONS

Exhibit A, showing color copy of two photographs of Makita Model LS 1011 compound saw.
Exhibit B, instruction manual for the Makita LS 1011.
Exhibit C, showing color copy of seven photographs of the Delta Model 34–080 saw, date unknown.
Four–Page Exhibit D, showing color photographs of an Elu TGS 71 miter saw.

(List continued on next page.)

Primary Examiner—Clark F. Dexter
(74) Attorney, Agent, or Firm—Harness, Dickey & Pierce, P.L.C.

(57) ABSTRACT

A dust or chip collection and diversion system is provided for a device having a cutting tool for performing a working operation on a workpiece. The position and orientation of the dust-receiving or dust-collecting opening remains constant with respect to the cutting tool regardless of the position or configuration of the device, the device having a movable blade or other cutting tool, thus greatly enhancing the dust collection effectiveness in any of a number of operational configurations. Such position and orientation of the dust-receiving opening is also independent of the movement or position of any adjustable or movable guard or workpiece-supporting fence.

21 Claims, 5 Drawing Sheets

U.S. PATENT DOCUMENTS

| | | | |
|---|---|---|---|
| 1,830,151 A | 11/1931 | Wilderson | 83/162 |
| 1,888,679 A | 11/1932 | Knapp | 83/440.2 |
| 3,322,169 A | 5/1967 | Hilliard | 83/100 |
| 3,339,597 A | 9/1967 | Kohler | 83/166 |
| 3,401,724 A | 9/1968 | Kreitz | 83/471.3 |
| 3,585,980 A | 6/1971 | Mellor | 125/13.01 |
| 3,998,121 A | 12/1976 | Bennett | 83/471.3 |
| 4,028,975 A | 6/1977 | Bennett | 83/397 |
| 4,063,478 A | 12/1977 | Stuy | 83/478 X |
| 4,144,781 A | 3/1979 | Kreitz | 83/100 |
| 4,150,598 A | 4/1979 | Berends et al. | 83/478 |
| 4,201,256 A | 5/1980 | Truhan | 83/100 X |
| 4,241,505 A | 12/1980 | Bodycomb, Jr. et al. | 83/100 X |
| 4,253,362 A | 3/1981 | Olson | 83/100 |
| 4,255,995 A | 3/1981 | Connor | 83/100 |
| 4,300,426 A | 11/1981 | Weaver | 83/100 X |
| 4,367,665 A | 1/1983 | Terpstra et al. | 83/100 |
| 4,517,869 A | 5/1985 | Kuhlmann et al. | 83/100 |
| D282,346 S | 1/1986 | Pioch | D8/66 |
| 4,576,072 A | 3/1986 | Terpstra et al. | 83/100 X |
| 4,694,720 A | 9/1987 | Brickner, Jr. et al. | 83/471.3 |
| 4,694,721 A | 9/1987 | Brickner, Jr. | 83/471.3 |
| 4,721,023 A | 1/1988 | Bartlett et al. | 83/100 |
| D295,823 S | 5/1988 | Brickner, Jr. et al. | D15/133 |
| 4,794,740 A | 1/1989 | Keith et al. | 451/456 |
| 4,799,416 A | 1/1989 | Kumasaka et al. | 83/471.3 X |
| 4,869,142 A | 9/1989 | Sato et al. | 83/467.1 |
| D305,542 S | 1/1990 | Miyamoto et al. | D15/133 |
| D306,031 S | 2/1990 | Ushiwata et al. | D15/133 |
| 4,934,233 A | 6/1990 | Brundage et al. | 83/581 X |
| 5,038,650 A | 8/1991 | Hodge | 83/471.3 |
| 5,084,972 A | 2/1992 | Waugh | 83/100 X |
| D331,416 S | 12/1992 | Fushiya et al. | D15/133 |
| D336,652 S | 6/1993 | Arehart | D15/133 |
| 5,297,463 A | * 3/1994 | O'Banion et al. | 83/471.3 |
| 5,421,228 A | 6/1995 | Fukinuki | 83/471.3 |
| 5,819,619 A | * 10/1998 | Miller et al. | 83/100 |

OTHER PUBLICATIONS

Exhibit A, showing intercompany invoice of Makita USA showing the transfer of the TGS71 miter saw, date unknown.
Exhibit B, catalog showing the TGS71 miter saw, date unknown.
Exhibit A, showing video tape prepared by Makita USA showing operation of the Elu TGS 71 miter saw.

* cited by examiner

DUST COLLECTION SYSTEM FOR COMPOUND MITER SAW

This is a continuation of U.S. patent application Ser. No. 08/600,907 filed Feb. 13, 1996, now U.S. Pat. No. 5,819,619, which is a continuation of application Ser. No. 08/329,766 filed Oct. 27, 1994 (now abandoned), which is a continuation of application Ser. No. 08/088,266 filed Jul. 7, 1993 (now abandoned), which is a continuation of application Ser. No. 07/774,767 filed Oct. 9, 1991 (now abandoned).

BACKGROUND AND SUMMARY OF THE INVENTION

The present invention relates generally to dust or chip collection systems for saws or other power operated equipment or machinery. More particularly, the invention relates to such dust or chip collection systems with the dust collector being disposed on a movable portion of the saw or other such equipment in order to maintain proper dust-collecting alignment with a movable saw blade or other work-performing device while performing various operations on a workpiece.

Saws and other apparatuses designed for cutting or performing other working operations on a workpiece frequently require a saw blade, cutter, or other such work-performing device that is movable to a number of different positions or orientations for performing various operations. Examples of such equipment include compound miter saws, which allow the user to selectively move the saw blade into any of a number of positions or modes for square cutting, for miter cutting, for bevel cutting, or for compound cutting where a combination miter and bevel are cut. In addition, some operations, such as shaping or dado cutting operations, for example, require the use of saw blades or other cutting devices of different shapes or sizes to be substituted for one another in order to perform the desired operation on the workpiece, whether the workpiece is composed of wood, plastic, metal, or other materials. In most examples of such equipment, it is highly desirable to provide a dust collection system for diverting dust and chips away from the user.

In order to accommodate these widely varied working operations, dust collection ducts, or openings are frequently disposed on an adjustable guard so as to be at least partially adjustable for various operations, or on a fence in order to accommodate the varied positions or orientations of the blade or other cutter. If such dust collector adjustability, by way of adjustment of the guard, were not provided, a substantial loss of dust-collecting effectiveness would result, or a very large dust collection opening would have to be provided in order to accommodate the widely varying range of movement, position, or size of the saw blade, cutter, or other working device. Such collection ducts or openings on guards or fences have been found to be relatively ineffective in many of their adjusted positions, and such large collection openings have been found to be cumbersome and disadvantageous because of the space occupied by them.

In an attempt to address the above-discussed problems, a variety of other dust collection arrangements have previously been provided. However, many of such prior arrangements have suffered the same or other disadvantages, including difficulty in maintaining proper alignment between the dust collection duct or opening and the saw blade or other cutter, inconvenience and interference when performing operations on large or odd-shaped workpieces, the possibility of inadvertently misplacing separate dust collection components, lack of adequate dust collection, or other similar short-comings. Thus, the need has arisen for a dust collection system for compound miter saws, or other power equipment with movable or adjustable blades or cutters, which overcomes these disadvantages, as well as providing greater dust-collection effectiveness, improved ease of operation, economy in manufacturing, and other advantages that will become readily apparent to those skilled in the art from the discussion below.

In accordance with the present invention, an improved dust collection system for a saw or other device having a movable blade or cutting tool is provided. The dust collection system is spaced away from the saw blade or other cutting tool, is separate from any blade or cutter guard, and includes a dust-receiving opening that is at a fixed location relative to the movable blade or cutting tool and movable therewith. Preferably, the dust-receiving opening has an orientation relative to the blade or cutting tool that is aligned with a line that extends between the opening and the blade or cutting tool, with such line extending along a tangent to the rotation of the blade or cutting tool, and with such tangent preferably being at a location on the blade or cutting tool that engages the workpiece when the blade or cutting tool is moved to a workpiece-engaging position. Such dust collection opening orientation thus remains essentially constant during movement of the blade or cutting tool and is independent of any adjustment of the guard.

In preferred embodiments of the present invention for compound miter saws, for example, the dust-receiving opening is disposed at the open end of a dust duct that is interconnected with a pivot mechanism that is adapted for pivotally moving the saw blade into and out of engagement with a workpiece and for pivotally moving the saw blade among various cutting configurations. Such preferred dust duct is pivotally movable with a pivot arm and is preferably disposed in a bifurcated portion of the pivot arm in a space between a pair of spaced-apart legs. The dust duct is adapted for conveying dust or chips away from the saw and the user and can be connected in dust-conveying communication with a dust collection receptacle, either with or without powered dust extraction or dust-conveying vacuum equipment.

Additional objects, advantages, and features of the present invention will become apparent from the following description and the appended claims, taken in conjunction with the accompanying drawings.

DETAILED DESCRIPTION OF THE PREFERRED EMBODIMENTS

FIGS. 1 through 10 illustrate an exemplary compound miter saw having a dust collection system according to the present invention, shown merely for purposes of illustration. One skilled in the art will readily recognize from the following description, taken in conjunction with the accompanying drawings and claims, that the principles of the invention are equally applicable to compound miter saws or other saws of types other than that shown for purposes of illustration in the drawings. Similarly, one skilled in the art will readily recognize that the principles of a dust collection system according to the invention are also applicable to other types of powered, or even unpowered, equipment for performing an operation on a workpiece. Such other types of equipment include so-called "chop" saws, dado saws, spindle shapers, spindle sanders, or other types of powered or unpowered devices that require movable blades or cutters in order to perform various different workpiece working operations.

Referring primarily to FIGS. 1 through 4, an exemplary compound miter saw 10 typically has a base assembly 12, including a table assembly 13, which is preferably rotatable in order to accommodate the various cutting modes discussed below. The saw 10 also includes a saw blade 14, at least partially enclosed by a blade guard 16 and driven by a motor 17, and a handle 18, which allows the operator to move the saw blade 14 and the blade guard 16 from a clear position free of a workpiece 11 (FIG. 4) to a cutting position with the saw blade 14 in cutting engagement with the workpiece 11.

As is conventional in this type of equipment, a fence assembly, indicated generally by reference numeral 20, is interconnected with the base assembly 12 and extends laterally across the table assembly 13, against which the workpiece 11 is positioned and supported for performing a cutting operation thereon. The illustrated fence assembly 20 includes a fixed fence portion 22 and a movable fence portion 24 with the fixed and movable fence portions 22 and 24, respectively, extending in a mutually aligned lateral direction, to define a workpiece abutment surface and with the movable fence portion 24 being laterally spaced away from the fixed fence portion 22. Such lateral spacing or gap between the fixed and movable fence portions 22 and 24, respectively, provides clearance for the saw blade to perform a cutting operation completely through the workpiece 11, regardless of the mode or type of cutting operation being performed. As is discussed in more detail below, the movable fence portion 24 is laterally movable toward and away from the fixed fence portion 22 in order to allow the operator to selectively adjust the clearance gap therebetween and thus accommodate the particular cutting operation being performed.

As is typical in this type of equipment, the compound miter saw 10 depicted in the drawings is capable of a number of different cutting modes or positions. Such positions include those for straightcross-cutting operations, straight miter-cutting operations, bevel cutting operations, and various combinations of bevel cutting and miter cutting, commonly called compound cutting operations, with the adjustable fence assembly 20 being adjustable to provide the minimum required clearance gap between the fixed and movable fence portions 22 and 24, respectively, in any of these cutting modes.

These various cutting operations or working modes, or combinations thereof, are accomplished by way of a compound pivot mechanism 34, including a pivot arm assembly 21, which is pivotally interconnected with the rotatable table assembly 13. The pivot arm assembly 21 includes a pivot mechanism 23 providing for pivotal movement of the saw blade 14 into and out of engagement with the workpiece 11, and a pivot mechanism 25 providing for pivotal movement of the saw blade 14 among a number of square or bevel cutting configurations. Lateral swinging movement is accomplished by way of the above-mentioned table assembly 13, which is disposed for rotation relative to the base assembly 12, thus accommodating movement among the various cutting configurations.

The pivot arm assembly 21 includes a bifurcated lower and rearward end configuration, with this portion of the pivot arm assembly 21 being split to form a pair of pivot legs 29 and 31 with a space therebetween for receiving a dust duct 33 therebetween. The dust duct 33 has a longitudinal centerline 33', and further has a preferably rectangular-shaped dust-receiving opening 35 at its forward end, a transitional intermediate portion 37, and a preferably circular outlet opening 39, to which any of a number of suitable dust-conveying fittings 47, or other accessories, can be attached.

Figure 1:
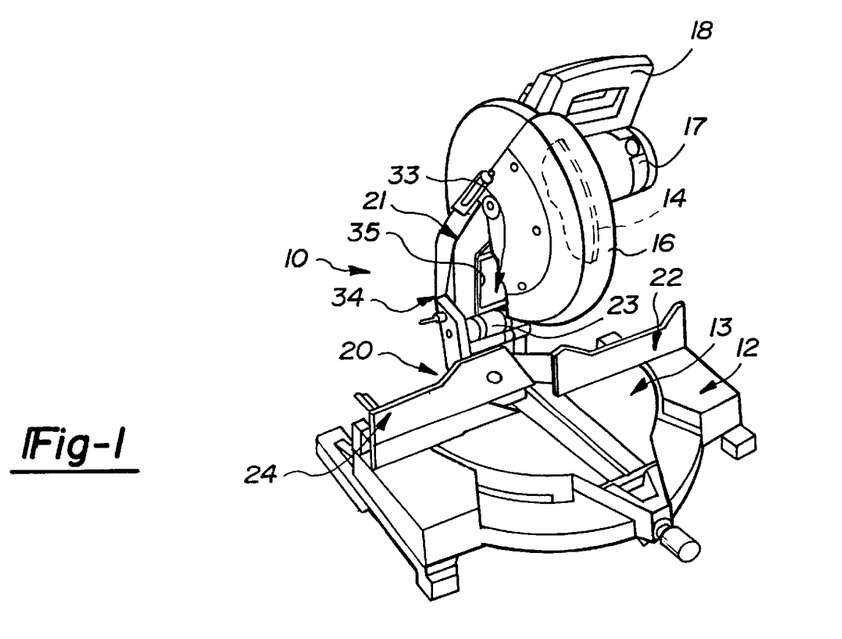
FIG. 1 is a front perspective view of an exemplary compound miter saw featuring a dust collection system according to the present invention.
Figure 2:
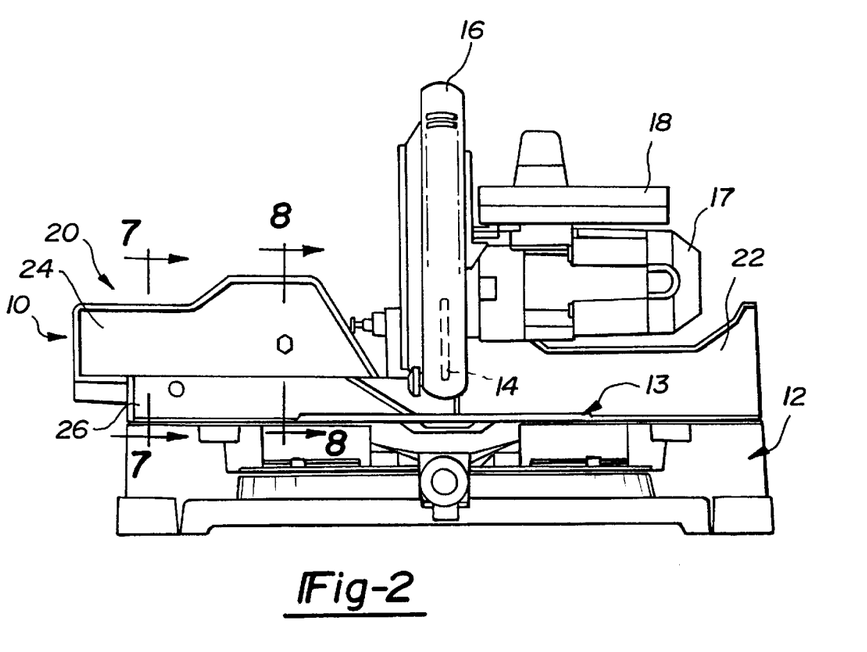
FIG. 2 is a front elevational view of the compound miter saw of FIG. 1.
Figure 3:
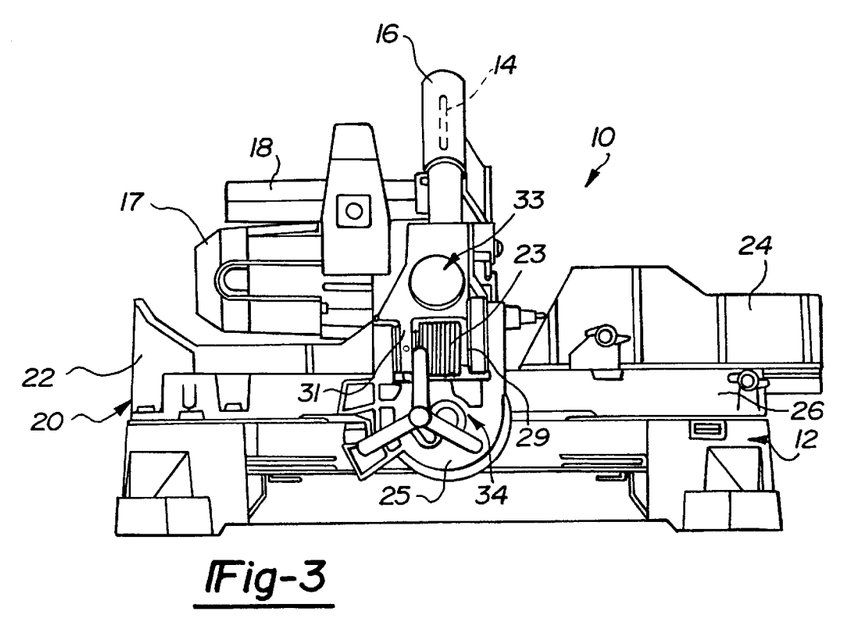
FIG. 3 is a rear elevational view of the compound miter saw of FIGS. 1 and 2.
Figure 4:
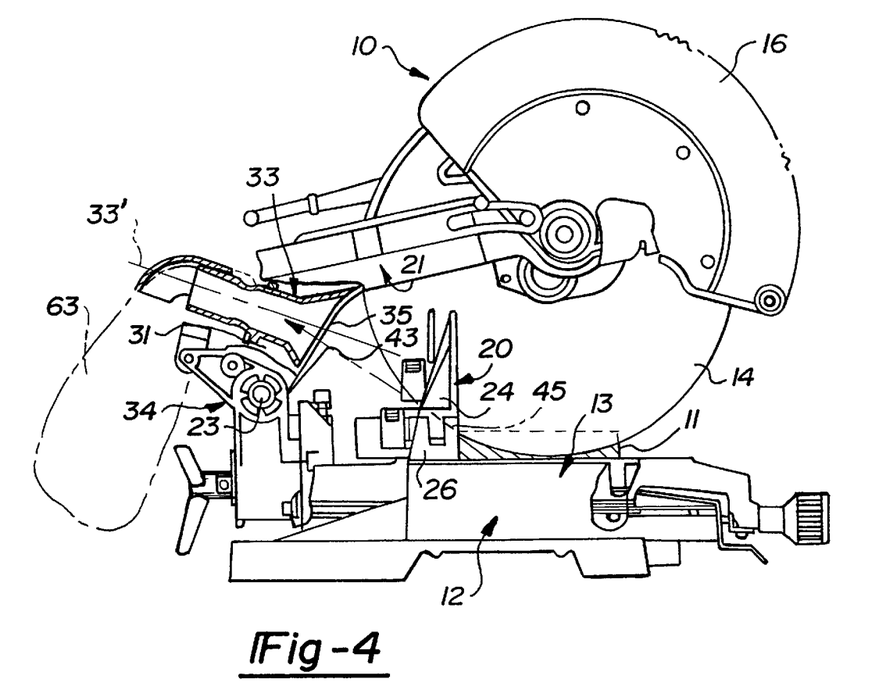
FIG. 4 is a left end elevational view of the compound miter saw of FIGS. 1 through 3, with portions cut away to illustrate the dust-receiving duct of the present invention.
Figure 5:
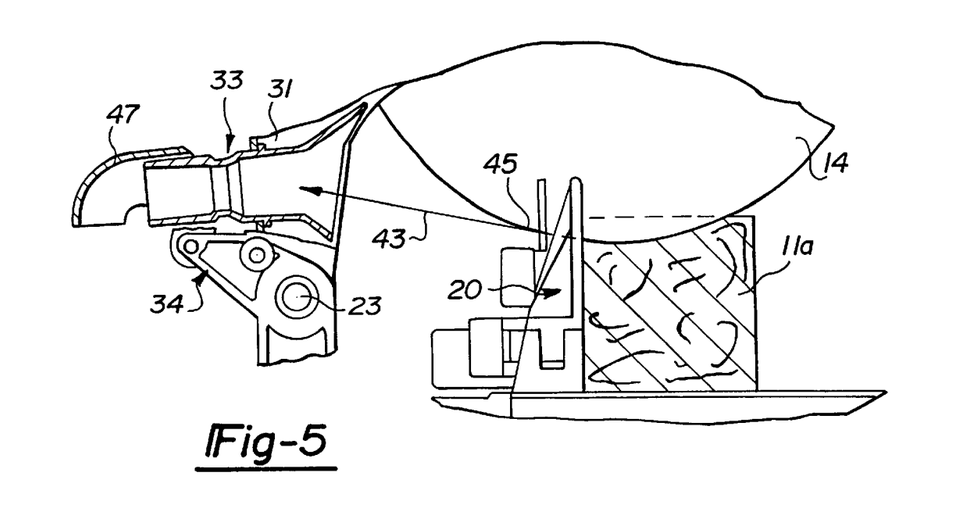
FIG. 5 is a schematic elevational view, diagrammatically illustrating the exemplary compound miter saw in use for cutting a relatively thick workpiece.
Figure 6:
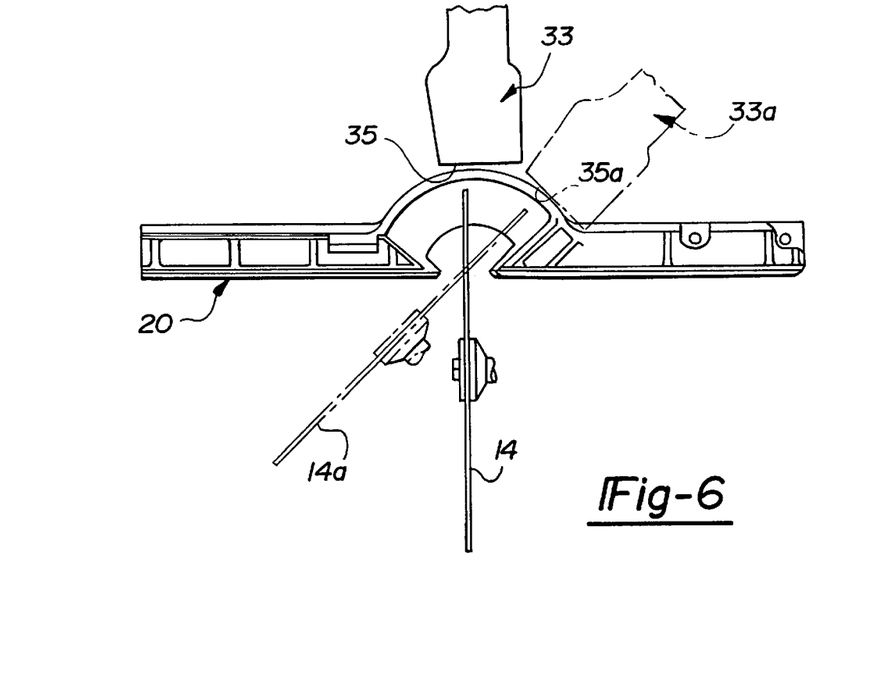
FIG. 6 is a schematic top plan view, diagrammatically illustrating the exemplary compound miter saw in use for performing a miter-cutting operation.
Figure 7:
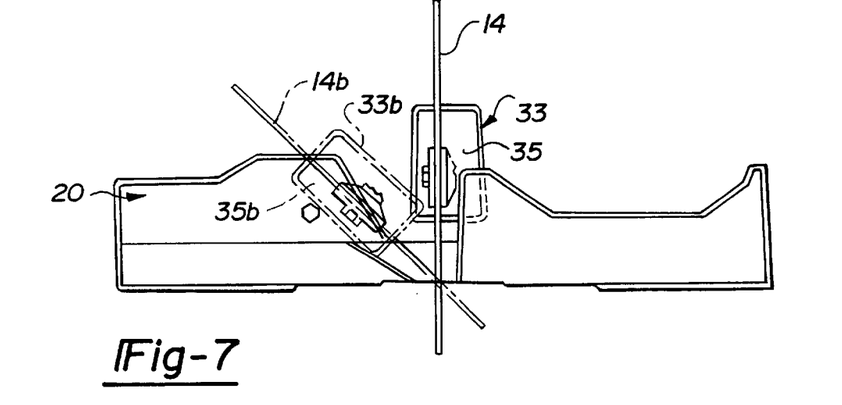
FIG. 7 is a schematic elevational view, similar to that of FIG. 6, but diagrammatically illustrating a bevel-cutting operation.

As is shown in the end elevation view of FIG. 4, as well as schematically, or diagrammatically, represented in FIGS. 5 through 7, the dust duct 33 pivotally moves with the pivot arm assembly 21 and/or the rotatable table assembly 13, and thus with the saw blade 14, into and out of engagement with the workpiece 11 (or even a workpiece 11a of different size or shape) in any of the square cross-cutting, bevel-cutting, miter-cutting, or compound miter-cutting operations of which the compound miter saw 10 is capable. However, because the dust duct 33 is fixedly interconnected with the pivot arm assembly 21, its position and orientation relative to the saw blade 14 remains constant during any of these operational modes or configurations, thus contributing greatly to the consistency and effectiveness of the dust collection system in the compound miter saw 10, or in other devices having movable work-performing tools.

Preferably, as shown in FIGS. 4 and 5, the constant position and orientation of the dust duct 33 is such that the dust-receiving opening 35 is aligned substantially along a line 43 between the dust-receiving opening 35 and the periphery of the saw blade 14, with the line 43 extending along a tangent to the rotation of the saw blade 14 at a location thereon at which the saw blade 14 engages the workpiece 11 (or 11a). In most, if not all, applications of the present invention, the effectiveness of the dust collection system is maximized when the compound miter saw 10 (or other work-performing device) is configured such that the line 43 is along a tangent to the rotation of the saw blade 14 (or other cutting tool) at a location 45 at which the saw blade 14 (or other cutting tool) exits the workpiece, with such tangent extending generally to the center of the dust-receiving opening 35, and with such orientation remaining constant regardless of the position of the movable saw blade 14 (or other cutting tool).

By way of such an arrangement, the dust duct 33 (and the dust-receiving opening 35) can be much smaller than would otherwise be required of a stationary dust collection duct in order to accommodate the wide variance of positions and movement of the saw blade 14 (or other cutting tool) in a device such as the compound miter saw 10. In addition, in a vacuum-powered dust extraction application (such as that discussed below in connection with FIG. 8, for example), the dust-conveying kinetic energy provided by such a system can be better concentrated in the area to which dust or chips are propelled by the blade or cutting tool. Still further contributing to the effectiveness of the dust collection system of the present invention is the fact that the position and orientation of the dust duct 33, and thus the dust-receiving opening 35, remains constant relative to the saw blade 14 regardless of the movement or adjusted position of either of the blade guard 16 or the fence assembly 20. Thus the present invention provides a distinct performance advantage over dust collection ducts or openings attached to, or incorporated into, either of these components.

FIGS. 6 and 7 schematically or diagrammatically illustrate a significant feature of the present invention wherein the orientation of the dust receiving opening 35 of the dust duct 33 remains constant relative to the saw blade 14, regardless of the operational configuration in which the compound miter saw 10 is used. In FIG. 6, a miter-cutting operation is diagrammatically illustrated, with exemplary miter-cutting positions of the blade 14, the dust duct 33, and the dust-receiving opening 35 being shown in phantom lines and indicated by reference numerals 14a, 33a, and 35a, respectively. FIG. 7 similarly diagrammatically illustrates exemplary bevel-cutting positions of these components in phantom lines and being indicated by reference numerals 14b, 33b, and 35b, respectively. One skilled in the art will readily appreciate that an exemplary compound cutting operation would involve a combination of these two configurations, as well as readily recognizing that the orientation of the dust-receiving opening 35 and the dust duct 33 remains constant relative to the saw 14 in any of these configurations, and in both a raised, at-rest position and a work-engaging position (as shown with reference to FIGS. 1 and 4). Furthermore, as is shown in FIGS. 1 through 4, for example, the dust duct 33 is separate and independent from the blade guard 16 and is therefore not affected by guard movement or adjustment.

Figure 8:
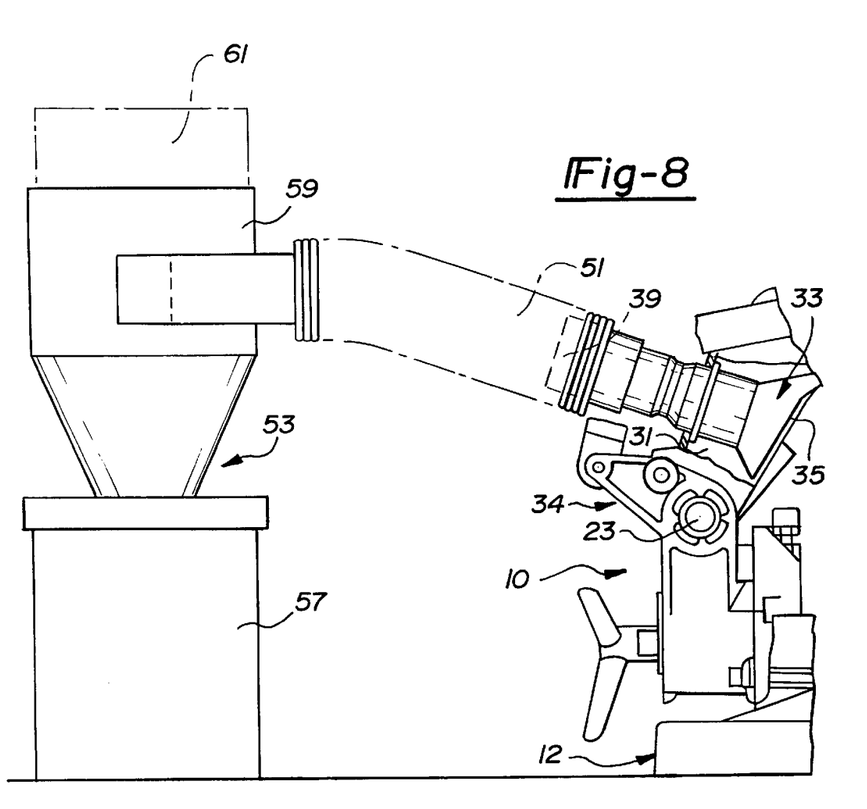
FIG. 8 is an elevational view illustrating the optional inclusion of a dust collection receptacle in the exemplary dust collection system of the present invention.

In FIG. 8, the dust duct 33 is shown with its outlet opening 39 optionally connected, by way of a flexible hose or conduit 51, to an accessory dust collection receptacle assembly 53. The assembly 53 preferably includes a removable collection vessel or bin 57 with a conventional centrifugal separator 59 emptying into the bin 57. As a further option, the assembly 53 can include a powered vacuum-producing fan or blower device 61, shown schematically in FIG. 8 in phantom lines. With such an optional arrangement, either with or without powered vacuum dust-conveying capabilities, the dust extracted and conveyed away from the saw 10 can be contained and collected for convenient disposal. In lieu of the arrangement shown in FIG. 8, however, a conventional dust collection bag accessory 63 can also optionally be provided, as shown schematically in FIG. 4, where greater portability is desired.

Figure 9:
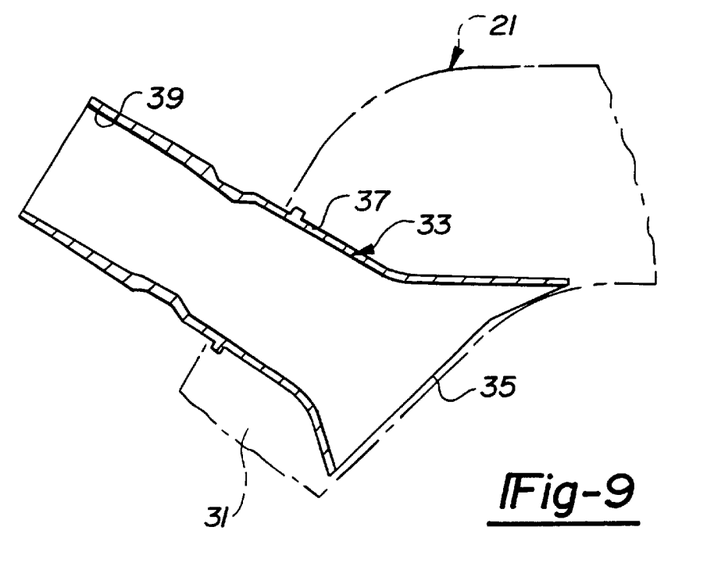
FIG. 9 is a cross-sectional detail view of a preferred dust collection duct according to the invention.
Figure 10:
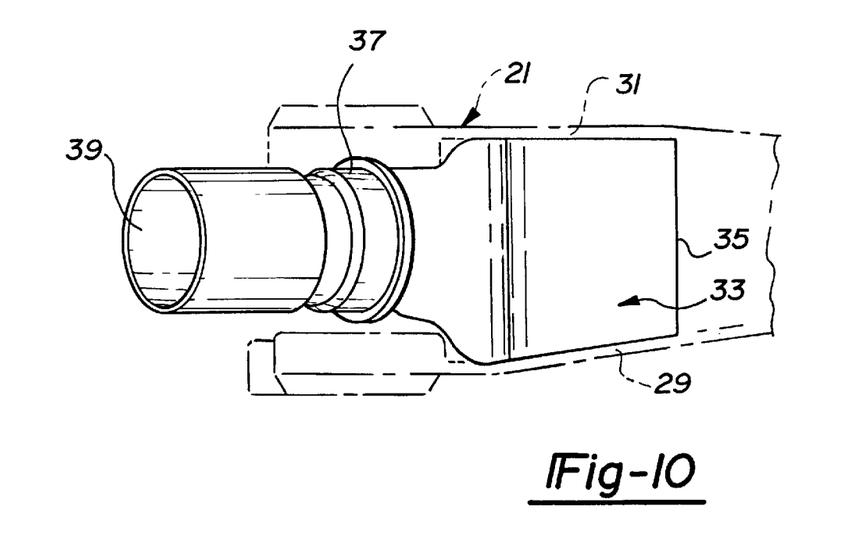
FIG. 10 is a top detail view of a preferred dust collection duct according to the invention.

FIGS. 9 and 10 illustrate an exemplary, generally "funnel-shaped", configuration for the dust duct 33, with a preferred generally rectangular cross-section for the dust-receiving opening 35, and with the transitional intermediate portion 37 converging to a preferred circular outlet opening 39. As shown in FIGS. 4 and 5, for example, an accessory dust deflector or diverter 47 can be advantageously added to the outlet 39, especially when no accessory collector is used. Such a shape or configuration has been found to be highly effective in dust collection or extraction in experimental prototype versions of the compound miter saw 10. One skilled in the art will readily recognize, however, that variations or modifications on this configuration, including the adding of accessories as discussed above, may be desirable or required in other types of work-performing devices or applications.

Accordingly, the exemplary compound miter saw 10 constructed in accordance with the principles of the present invention, includes a dust collection system that provides for enhanced dust extraction and diversion away from the operator when performing any of the widely divergent cutting operations, in any of the various operational configurations, of which the compound miter saw 10 is capable. Furthermore, it provides such increased effectiveness regardless of the size or shape of the workpiece (within the saw's design parameters) and regardless of the movement or position of the guard or fence. All of such features greatly contribute to the well-being and comfort of the operator, as well as the cleanliness of the work area.

The foregoing discussion discloses and describes merely exemplary embodiments of the present invention for purposes of illustration only. One skilled in the art will readily recognize from such discussion, and from the accompanying drawings and claims, that various changes, modifications, and variations may be made therein without departing from the spirit and scope of the invention as defined in the following claims.

What is claimed is:

1. A compound miter saw comprising:

a base;

a table rotatably disposed on said base, said table having a table plane and an axis of rotation substantially perpendicular to the table plane;

a first fence mounted on said base and having a first highest point from the table plane;

a second fence mounted on said base and having a second highest point from the table plane, the first and second fences defining a fence plane;

a first pivot mechanism rotatably connected to the table for rotation about a bevel axis, said first pivot mechanism defining a bevel plane substantially parallel to and at a fixed non-adjustable distance from the axis of rotation of the table;

a pivot arm pivotally connected to the first pivot mechanism by a second pivot mechanism, the pivot arm comprising a pair of spaced-apart leg portions, a part of each leg portion being pivotally attached to the second pivot mechanism for pivotable movement about a chopping axis, the chopping axis being lower than at least one of the first and second highest points;

a rotatable cutting tool mounted on the pivot arm for cutting a workpiece, the cutting tool and pivot arm being pivotable about said chopping axis by said second pivot mechanism for selective chopping movement where the cutting tool moves towards the table in order to cut the workpiece; and a generally linear dust-receiving duct having a longitudinal centerline an inlet for receiving dust during performance of a workpiece cutting operation, and an outlet for exhausting dust during the performance of the cutting operation, wherein the dust-receiving duct is positioned in the space between the leg portions such that the inlet is located at one side of the pivot arm and the outlet is located at the other side of the pivot arm;

the dust-receiving duct is oriented relative to the cutting tool so that a tangent line of the cutting tool extends into the inlet, the tangent line originating at about a point of intersection between a locus of points formed by the rotation of the periphery of the cutting tool and a portion of the fence plane contained between the first highest point, the second highest point and the table plane, the tangent line and the longitudinal centerline of the dust-receiving duct being generally coplanar defining a duct plane that is generally perpendicular to said chopping axis; and the orientation of the dust-receiving duct relative to the cutting tool remains substantially constant during the cutting operation.

2. The miter saw of claim 1, further comprising an adjustable guard covering at least a portion of the cutting tool.

3. The miter saw of claim 2, wherein the orientation of the dust-receiving duct relative to the cutting tool remains substantially constant during the cutting operation independently of adjustment of the adjustable guard.

4. The miter saw of claim 1, wherein the dust-receiving duct is disposed on said pivot arm at a location between said first pivot mechanism and the rotatable cutting tool.

5. The miter saw of claim 1, further comprising a dust conduit in communication with the dust-receiving duct for conveying dust.

6. The miter saw of claim 5, further comprising a dust collection receptacle in communication with a terminal end of said dust conduit for receiving dust therein.

7. The miter saw of claim 6, further comprising a powered vacuum device connectively disposed between the dust conduit and the dust collection receptacle for forcibly conveying dust from the dust conduit.

8. The miter saw of claim 1, wherein the first pivot mechanism is non-slidably connected to the table.

9. The miter saw of claim 1, wherein the dust-receiving duct is generally funnel-shaped in configuration.

10. The miter saw of claim 1, wherein the inlet has a larger opening that an opening of the outlet.

11. The miter saw of claim 1, wherein the inlet is generally rectangular in shape.

12. A compound miter saw comprising:

a base;

a table rotatably disposed on said base, said table having a table plane and an axis of rotation substantially perpendicular to the table plane;

a first fence mounted on said base and having a first highest point from the table plane;

a second fence mounted on said base and having a second highest point from the table plane, the first and second fences defining a fence plane;

a first pivot mechanism rotatably and non-slidably connected to the table for rotation about a bevel axis, said pivot mechanism being at a fixed non-adjustable distance from the axis of rotation of the table;

said first pivot mechanism pivotable about the bevel axis to define a bevel plane substantially parallel to and at a fixed non-adjustable distance from the axis of rotation of the table;

a pivot arm pivotally connected to the first pivot mechanism by a second pivot mechanism, the pivot arm comprising a pair of spaced-apart leg portions, a part of each leg portion being pivotally attached to the second pivot mechanism for pivotable movement about a chopping axis, the chopping axis being lower than at least one of the first and second points;

a rotatable cutting tool mounted on the pivot arm for cutting a workpiece, the cutting tool and pivot arm being pivotable about said chopping axis by said second pivot mechanism for selective chopping movement where the cutting tool moves towards the table in order to cut the workpiece; and a generally linear dust-receiving duct having a longitudinal centerline, an inlet for receiving dust during performance of a workpiece cutting operation, and an outlet for exhausting dust during the performance of the cutting operation, wherein the dust-receiving duct is positioned in the space between the leg portions such that the inlet is located at one side of the pivot arm and the outlet is located at the other side of the pivot arm;

the dust-receiving duct is oriented relative to the cutting tool so that a tangent line of the cutting tool extends into the inlet, the tangent line originating at about a point of intersection between a locus of points formed by the rotation of the periphery of the cutting tool and a portion of the fence plane contained between the first highest point, the second highest point and the table plane, the tangent line and the longitudinal centerline of the dust-receiving duct being generally coplanar defining a duct plane that is generally perpendicular to said chopping axis; and the orientation of the dust-receiving duct relative to the cutting tool remains substantially constant during the cutting operation.

13. The miter saw of claim 12, further comprising an adjustable guard covering at least a portion of the cutting tool.

14. The miter saw of claim 13, wherein the orientation of the dust-receiving duct relative to the cutting tool remains substantially constant during the cutting operation independently of adjustment of the adjustable guard.

15. The miter saw of claim 12, wherein the dust-receiving duct is disposed on said pivot arm at a location between said first pivot mechanism and the rotatable cutting tool.

16. The miter saw of claim 12, further comprising a dust conduit in communication with the dust-receiving duct for conveying dust.

17. The miter saw of claim 16, further comprising a dust collection receptacle in communication with a terminal end of said dust conduit for receiving dust therein.

18. The miter saw of claim 17, further comprising a powered vacuum device connectively disposed between the dust conduit and the dust collection receptacle for forcibly conveying dust from the dust conduit.

19. The miter saw of claim 12, wherein the dust-receiving duct is generally funnel-shaped in configuration.

20. The miter saw of claim 12, wherein the inlet has a larger opening that an opening of the outlet.

21. The miter saw of claim 12, wherein the inlet is generally rectangular in shape.

* * * * *